United States Patent
Takase et al.

(10) Patent No.: US 8,184,040 B2
(45) Date of Patent: May 22, 2012

(54) RADAR DEVICE AND A METHOD OF DETECTING A TARGET OBJECT USING RADAR

(75) Inventors: Masaya Takase, Nishinomiya (JP); Hitoshi Maeno, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 183 days.

(21) Appl. No.: 12/716,930

(22) Filed: Mar. 3, 2010

(65) Prior Publication Data

US 2010/0225525 A1 Sep. 9, 2010

(30) Foreign Application Priority Data

Mar. 4, 2009 (JP) ................ 2009-050357

(51) Int. Cl.
*G01S 13/22* (2006.01)
(52) U.S. Cl. .......... 342/134; 342/11; 342/112; 342/116; 342/135; 342/137; 342/179; 342/196
(58) Field of Classification Search .......... 342/90, 342/95–97, 107–112, 115–116, 129–136, 342/137, 179, 195, 196
See application file for complete search history.

(56) References Cited

U.S. PATENT DOCUMENTS

| | | | | |
|---|---|---|---|---|
| 3,728,725 A | * | 4/1973 | Bauer | 342/111 |
| 3,885,240 A | * | 5/1975 | Jensen | 342/106 |
| 4,315,746 A | * | 2/1982 | Heidrich | 434/2 |
| 4,593,286 A | * | 6/1986 | Mathews et al. | 342/88 |
| 4,851,848 A | * | 7/1989 | Wehner | 342/25 D |
| 5,583,505 A | * | 12/1996 | Andersen et al. | 342/13 |
| 5,943,004 A | * | 8/1999 | Groenenboom et al. | 342/128 |
| 6,078,281 A | * | 6/2000 | Milkovich et al. | 342/196 |
| 7,764,223 B2 | * | 7/2010 | Wade | 342/107 |
| 7,773,028 B2 | * | 8/2010 | Chan et al. | 342/137 |
| 2008/0018526 A1 | | 1/2008 | Wade | |

FOREIGN PATENT DOCUMENTS

| | | |
|---|---|---|
| EP | 1098206 A3 | 3/2004 |
| JP | 58-50482 A | 3/1983 |
| JP | 58-53778 A | 3/1983 |
| JP | 63-241482 A | 10/1988 |
| JP | 2000-75015 A | 3/2000 |
| JP | 2000-75015 A | 3/2000 |
| JP | 2001-116830 A | 4/2001 |
| JP | 2002-243842 A | 8/2002 |
| JP | 2008-527391 A | 7/2008 |

* cited by examiner

*Primary Examiner* — John B Sotomayor
(74) *Attorney, Agent, or Firm* — Birch, Stewart, Kolasch & Birch, LLP

(57) ABSTRACT

This disclosure provides a radar device including a transmission module for sequentially transmitting two or more kinds of pulse signals having different pulse widths by a predetermined transmitting pattern, a memory module for storing a predetermined number of pulse reply data corresponding to each kind of the pulse signals, the predetermined number being number of transmissions of the kind of the pulse signals, a pulse integrating module for performing pulse integration of the pulse reply data stored in the memory module for each kind of the pulse signal, and an image generating module for generating a radar image using the results of the pulse integration.

10 Claims, 6 Drawing Sheets

RADAR DEVICE AND A METHOD OF DETECTING A TARGET OBJECT USING RADAR

CROSS-REFERENCE TO RELATED APPLICATION(S)

This application claims priority under 35 U.S.C. §119 to Japanese Patent Application No. 2009-050357, which was filed on Mar. 4, 2009, the entire disclosure of which is hereby incorporated by reference.

TECHNICAL FIELD

The present invention relates to a radar device for transmitting a pulse signal to a detection area and detecting a target object. The present invention also relates to a method of detecting the target object using radar, which transmits a pulse signal to the detection area and detects the target object.

BACKGROUND

Conventionally, various types of radar devices for transmitting a pulse signal to a detection area and detecting a target object based on a reflection signal have been proposed. Such radar devices mostly require large electric power by utilizing a magnetron, and use a signal having a particular pulse width according to a set display range. However, for semiconductor radars which utilize a semiconductor as an oscillation device, because their transmission powers are very low as compared with the magnetron radars, they must have a longer pulse width of the pulse signal to transmit. In addition, if performing a long-distance detection, the pulse width must typically be longer than the case where a short-distance detection is performed. For these reasons, if the semiconductor radar performs a long-distance detection, it must transmit a pulse signal having even longer pulse width. Using the pulse signal having a longer pulse width in turn reduces a distance resolution and increase a blind area which cannot be detected.

In order to improve such reduction in the distance resolution, a technique in which modulation is applied to a transmission signal to pulse-compress the signal is generally used. Meanwhile, in order to suppress the blind area, JP 2008-527391 discloses a method of transmitting a long pulse signal for long-distance detection (a long pulse) together with two or more kinds of pulse signals whose pulse widths are shorter than the long pulse signal (an middle pulse signal and a short pulse signal).

Further, as for the resolution to the low transmission power of semiconductor radar, if a single pulse signal, which has a long pulse width as described above, is transmitted, an S/N ratio deteriorates, and thus, JP 3639124 (B) discloses a pulse integral method in which two or more pulse signals of the same kind are transmitted continuously, and two or more reflection signals (received signal) based on the pulse signals are integrated to be used for detection.

However, in order to continuously transmits signals having the same pulse width and then perform pulse integration of received signals for the transmission, if a radar device using the method of JP 3639124 (B) is applied to the method of JP 2008-527391 in which the short pulse signal, the middle pulse signal, and the long pulse signal are sequentially transmitted, the following situation arises.

FIG. 5 is a timing chart showing the case where transmission of the short pulse signal, the middle pulse signal, and the long pulse signal is repeated for three times. FIG. 6 is a schematic diagram showing the situation occurred when the transmission of FIG. 5 is performed.

In this case, the radar device first sequentially transmits short pulse signals PS11, PS12, and PS13 which constitute a short pulse group PSG1, and then sequentially transmits middle pulse signals PM11, PM12, and PM13 which constitute an middle pulse group PMG1. The radar device further sequentially transmits long pulse signals PL11, PL12, and PL13 which constitute a long pulse group PLG1. The radar device repeats the sequential transmission of the short pulse group PSG, the middle pulse group PMG, and the long pulse group PLG.

Then, the radar device performs pulse integration of received signals for each pulse group. For example, the radar device performs short-distance detection by performing pulse integration using the received signals caused by the short pulse signals PS11, PS12, and PS13. Similarly, the middle-distance detection is performed by carrying out pulse integration using the received signals caused by the middle pulse signals PM11, PM12, and PM13, and the long-distance detection is performed by carrying out pulse integration using the received signals caused by the long pulse signals PL11, PL12, and PL13.

As described above, by the time the device obtains one set of the pulse integration results, the device must transmit and receive the signals for three times for each pulse group, and therefore, a relatively long period of time is required to obtain the pulse integration results for all the detection distance ranges.

Further, in such a radar device, in order to detect all azimuth directions, its antenna rotates continuously at a predetermined speed. For this reason, if the pulse signals are sequentially transmitted and received for each detection distance group as shown in FIG. 5, a rotating angle of the antenna during the transmission and reception for one detection distance group will be greater than the case where a single pulse is used. Thereby, as shown in FIG. 6, an azimuth range $\Delta\theta_{M1} + \Delta\theta_{L1}$ in which the middle-distance detection and the long-distance detection are performed intervenes between azimuth ranges $\Delta\theta_{S1}$ and $\Delta\theta_{S2}$ in which two short-distance detections are performed. This causes the short-distance detection to be inhibited during the period during which the middle-distance detection and the long-distance detection are performed. The same can be said for each of the middle-distance detection and the long-distance detection. That is, an azimuth range where large-range detection cannot be performed will occur for each detection distance area.

SUMMARY

Therefore, the present invention provides a radar device of simple and low-cost configuration capable of preventing an azimuth range which cannot be detected in each detection distance area from being greater, even if pulse integration is used. The present invention also provides a method of detecting a target object using radar, which can prevent an azimuth range which cannot be detected in each detection distance area from being greater, even if pulse integration is used.

According to an aspect of the invention, a radar device including a transmission module for sequentially transmitting two or more kinds of pulse signals having different pulse widths by a predetermined transmitting pattern, a memory module for storing a predetermined number of pulse reply data corresponding to each kind of the pulse signals, the predetermined number being number of transmissions of the kind of the pulse signals, a pulse integrating module for performing pulse integration of the pulse reply data stored in the memory module for each kind of the pulse signal, and an image generating module for to generating a radar image using the results of the pulse integration.

With this configuration, the pulse reply data are stored separately according to the detection distance ranges. Typically, in the situation in which different kinds of pulse signals are transmitted while the kinds are switched, instead of sequentially storing corresponding pulse reply data for each kind of the pulse signals, they are stored separately is according to the kinds of pulse signals. Therefore, it is easier to read the pulse reply data when they are used for pulse integration processing for each distance range.

The memory module may include two or more classified-by-detection-distance memory sections classified by the kinds of pulse signals. When new pulse reply data is stored in each of the classified-by-detection-distance memory sections, the memory module may update the stored pulse reply data by the same number of the newest pulse reply data including the new pulse reply data so that time-series arrangement of the pulse reply data is maintained. The pulse integrating module may perform the pulse integration using the predetermined number of stored pulse reply data containing the new pulse reply data every time the memory updating is performed.

Alternatively, the memory module may include two or more classified-by-detection-distance memory sections classified by the kinds of pulse signals. The classified-by-detection-distance memory sections may each store a predetermined number of pulse reply data, the predetermined numbers being different for the kinds of pulse signals. The pulse integrating module may perform pulse integration of the pulse reply data stored in the classified-by-detection-distance memory section for each kind of the pulse signals.

According to another aspect of the invention, a radar device including a transmission module for repeatedly transmitting a pulse group containing two or more kinds of pulse signals having different pulse widths, a memory module for storing a predetermined number of pulse reply data corresponding to the transmitted pulse signals contained in each of the pulse groups, the predetermined number being number of transmissions of the pulse group, a pulse integrating module for performing pulse integration of the stored pulse reply data corresponding to the transmitted pulse signals contained in each of the pulse groups, and an image generating module for generating a radar image using the results of the pulse integration.

With this configuration, the pulse reply data are stored separately according to the detection distance ranges. Typically, in the situation in which different kinds of pulse signals are transmitted while the kinds are switched, instead of sequentially storing corresponding pulse reply data for each kind of the pulse signals, they are stored separately according to the kinds of pulse signals. Therefore, it is easier to read the pulse reply data when they are used for pulse integration processing for each distance range.

When new pulse reply data is stored in the memory module, the memory module may update the stored pulse reply data by the same number of the newest pulse reply data including the new pulse reply data so that time-series arrangement of the pulse reply data is maintained. The pulse integrating module may perform the pulse integration using the predetermined number of stored pulse reply data containing the new pulse reply data every time the memory updating is performed.

According to another aspect of the invention, a method of detecting a target object using radar includes sequentially transmitting two or more kinds of pulse signals having different pulse widths by a predetermined transmitting pattern, storing a predetermined number of pulse reply data corresponding to each kind of the pulse signals, the predetermined number being number of transmissions of the kind of the pulse signals, performing pulse integration of the stored pulse reply data for each kind of the pulse signal, and generating a radar image using the results of the pulse integration.

The storing the predetermined number of pulse reply data corresponding to each kind of the pulse signals may include, when new pulse reply data is stored in each of two or more classified-by-detection-distance memory sections classified by the kinds of pulse signals, updating the stored pulse reply data by the same number of the newest pulse reply data including the new pulse reply data so that time-series arrangement of the pulse reply data is maintained. The performing pulse integration of the stored pulse reply data for each kind of the pulse signal may include performing the pulse integration using the predetermined number of stored pulse reply data containing the new pulse reply data every time the memory updating is performed.

The storing the predetermined number of pulse reply data corresponding to each kind of the pulse signals may include storing, by each of two or more classified-by-detection-distance memory sections classified by the kinds of pulse signals, a predetermined number of pulse reply data, the predetermined numbers being different for the kinds of pulse signals. The performing pulse integration of the stored pulse reply data for each kind of the pulse signal may include performing pulse integration of the pulse reply data stored in the classified-by-detection-distance memory section for each kind of the pulse signals.

According to another aspect of the invention, a method of detecting a target object using radar includes repeatedly transmitting a pulse group containing two or more kinds of pulse signals having different pulse widths, storing a predetermined number of pulse reply data corresponding to the transmitted pulse signals contained in each of the pulse groups, the predetermined number being number of transmissions of the pulse group, performing pulse integration of the stored pulse reply data corresponding to the transmitted pulse signals contained in each of the pulse groups, and generating a radar image using the results of the pulse integration.

The storing the predetermined number of pulse reply data corresponding to the transmitted pulse signals contained in each of the pulse groups may include, when new pulse reply data is stored, updating the stored pulse reply data by the same number of the newest pulse reply data including the new pulse reply data so that time-series arrangement of the pulse reply data is maintained. The performing pulse integration of the stored pulse reply data corresponding to the transmitted pulse signals contained in each of the pulse groups may include performing the pulse integration using the predetermined number of stored pulse reply data containing the new pulse reply data every time the memory updating is performed.

BRIEF DESCRIPTION OF THE DRAWINGS

The present disclosure is illustrated by way of example and not by way of limitation in the figures of the accompanying drawings in which the like reference numerals display like elements and in which.

DETAILED DESCRIPTION

Figure 1A:
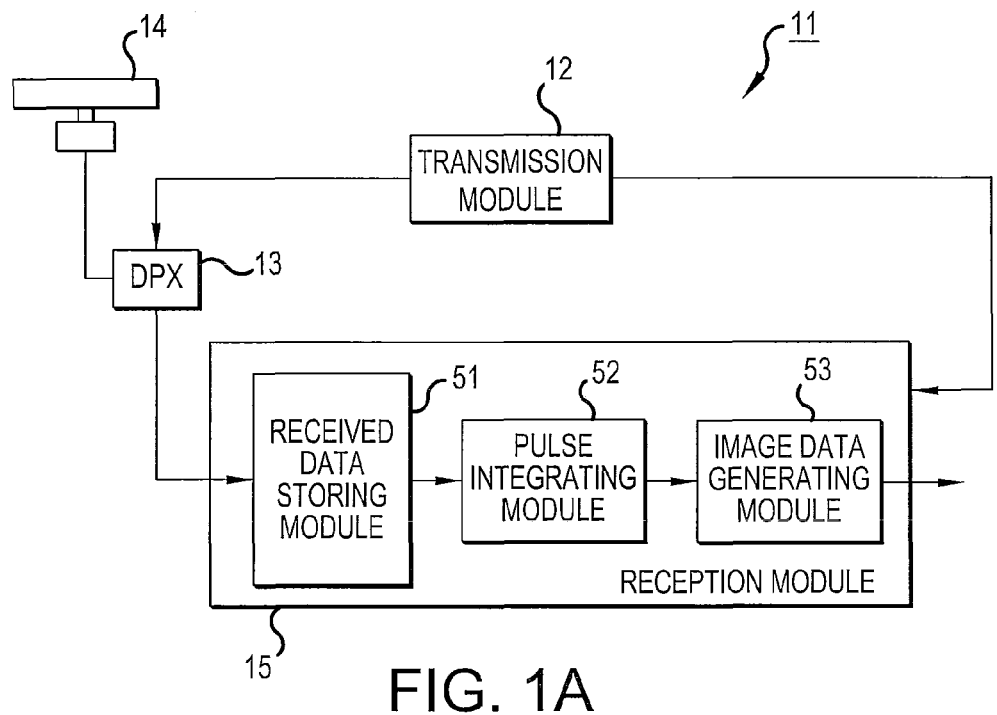
FIG. 1A is a block diagram illustrating a substantial configuration of a radar device according to an embodiment of the present invention.
Figure 1B:
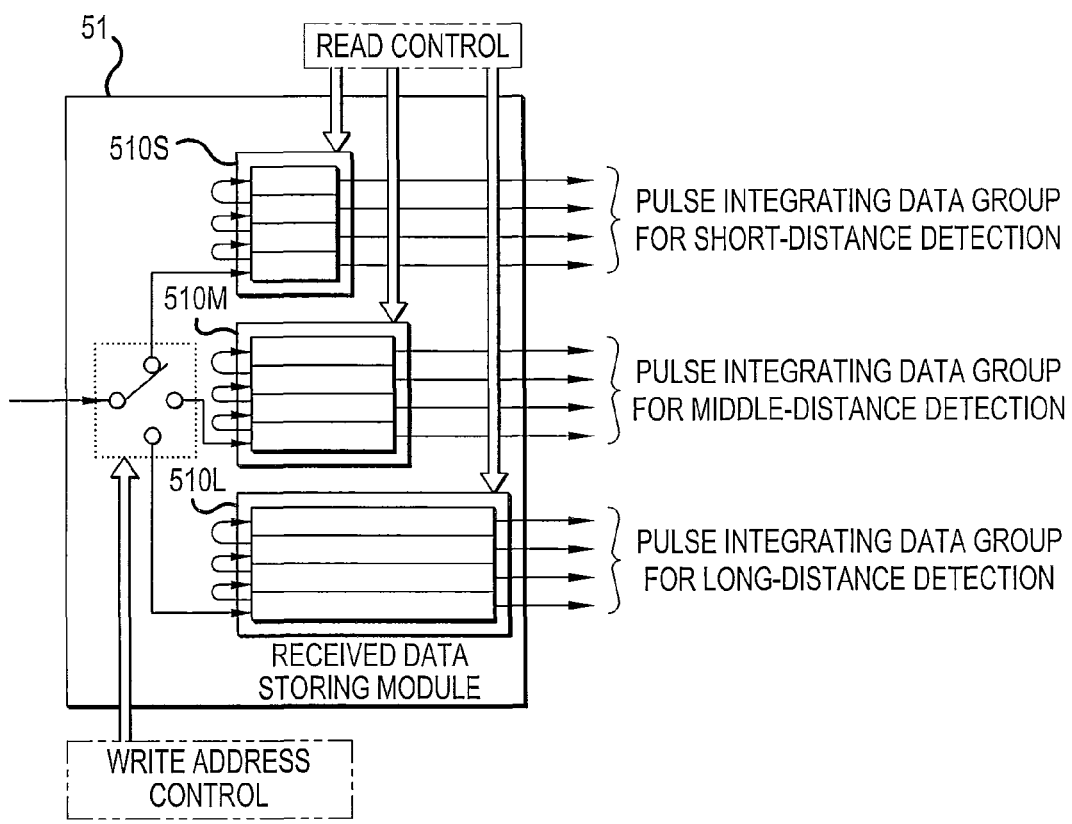
FIG. 1B is a block diagram illustrating a concrete configuration and operation of a received data storing module shown in FIG. 1A.

A radar device according to an embodiment of the present invention is described with reference to the appended drawings. FIG. 1A is a block diagram illustrating a substantial configuration of a radar device 11 of this embodiment, and FIG. 1B is a block diagram illustrating a concrete configuration and operation of a received data storing module 51 shown in FIG. 1A.

As shown in FIG. 1A, the radar device 11 includes a transmission module 12, a DPX (duplexer) 13, an antenna 14, and a reception module 15. The reception module 15 includes the received data storing module 51, a pulse integrating module 52, and an image data generating module 53.

Figure 2:
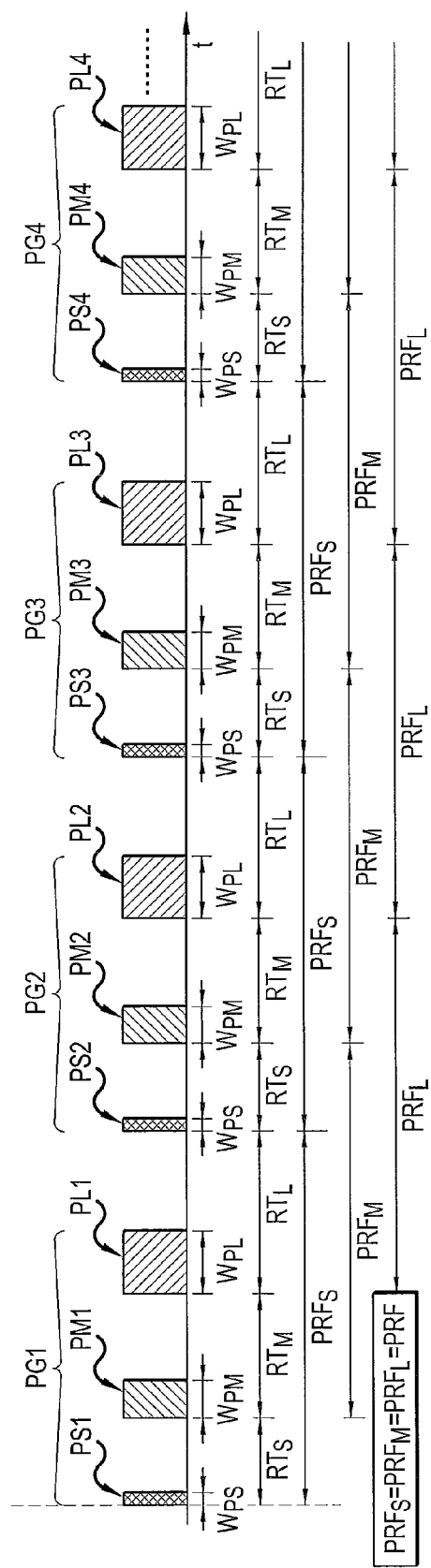
FIG. 2 is a timing chart showing an example of transmission timings and a sequence of pulse signals transmitted.

The transmission module 12 is controlled to output pulse signals at transmission timings as shown in FIG. 2, and in other words, the transmission module 12 outputs the pulse signals at set timings using a reference frequency signal. The outputted pulse signals are supplied to the antenna 14 via the DPX 13.

FIG. 2 is a timing chart showing an example of the transmission timings and the sequence of the pulse signals transmitted.

Specifically, when a short pulse transmission timing comes, the transmission module 12 outputs a short pulse signal PS1 having a pulse width $W_{PS}$. Next, the transmission module 12 outputs a middle pulse signal PM1 having a pulse width $W_{PM}$ after lapse of a time length $RT_S$ set for reception of a reflection signal based on the short pulse signal PS1 which is previously transmitted. Here, the receiving time length RTs is set so as to receive a reflection signal from a short-distance area to be detected by the short pulse signal PS1. The transmission module 12 then outputs a long pulse signal PL1 having a pulse width $W_{PL}$ after lapse of a time length $RT_M$ set for reception of the reflection signal based on the middle pulse signal PM1. Here, the receiving time length $RT_M$ for the middle pulse signal PM1 is set longer than the receiving time length $RT_S$ for the short pulse signal to detect the middle-distance area which is longer in distance than the detection area of the short pulse signal PS1.

Next, the transmission module 12 again outputs a short pulse signal PS2 having a pulse width $W_{PS}$ after lapse of a time length $RT_L$ set for reception of the reflection signal based on the long pulse signal PL1. Here, the receiving time length $RT_L$ is set longer than the receiving time length $RT_S$ for the short pulse signal and the receiving time length $RT_M$ for the middle pulse signal to detect the long-distance area which is further longer in distance than the detection areas of the short pulse signal PS1 and the middle pulse signal PM1.

After that, similarly, the transmission module 12 repeatedly and successively transmits the set of the short pulse signal PS, the middle pulse signal PM, and the long pulse signal PL having different pulse widths from each other, such as in the order of a middle pulse signal PM2, a long pulse signal PL2, a short pulse signal PS3, and so forth. That is, the transmission module 12 repeats transmission of a pulse transmitting groups PG each containing one short pulse signal PS, one middle pulse signal PM, and one long pulse signal PL arranged in time-series at the predetermined intervals.

In this embodiment, a pulse repetition cycle PRF of the pulse transmitting group PG is constant (for example, 3000 Hz). Thereby, a pulse repetition cycle $PRF_S$ of the short pulse signal PS, a pulse repetition cycle $PRF_M$ of the middle pulse signal PM, and a pulse repetition cycle $PRF_L$ of the long pulse signal PL are also constant. The pulse repetition cycle PRF is typically set based on a rotating speed of the antenna 14, a beam width of the transmission beam, and a required azimuth resolution.

The DPX (duplexer) 13 transmits each pulse signal from the transmission module 12 to the antenna 14. The antenna 14 transmits the supplied pulse signals to the exterior, while rotating at a constant speed set in advance (for example, 25 rpm). During the period while the pulse signals are not supplied, the antenna 14 receives the reflection signals from external target object(s) and outputs corresponding received signals to the DPX 13. The DPX 13 outputs the received signals from the antenna 14 to the reception module 15.

As described above, the reception module 15 includes the received data storing module 51, the pulse integrating module 52, and the image data generating module 53.

As shown in FIG. 1B, the received data storing module 51 includes memory sections 510S, 510M, and 510L classified by the detection distances, which can store different data lengths for pulse widths of the transmitted pulse signals. The memory sections 510S, 510M, and 510L store pulse reply data based on the respective pulse signals PS, PM, and PL so that a predetermined repetition number (four times in FIG. 3) of pulse reply data are stored. For example, the memory section 510S has four memory areas for storing short pulse reply data so that each short pulse reply data is sequentially stored in each memory area, respectively.

Here, as described above, because the transmitted pulse signals are the short pulse signal PS, the middle pulse signal PM, and the long pulse signal PL sequentially switched, the pulse reply data are also inputted such that the short pulse reply data, the middle pulse reply data, and the long pulse reply data are sequentially switched accordingly. For this reason, during a period while the short pulse reply data is inputted, the received data storing module 51 controls a write address based on transmission timing information from the transmission module 12 so that the data is inputted into the memory section 510S. Similarly, the received data storing module 51 controls a write address during a period while the middle pulse reply data is inputted so that the data is inputted into the memory section 510M, and controls a write address during a period while the long pulse reply data is inputted so that the data is inputted into the memory section 510L. The received data storing module 51 also controls read-out of the memory sections 510S, 510M, and 510L at predetermined read-out timings set in advance. Note that the read-out timings are set separately from the write timings described above. For example, as for the short-distance detection, the timing may be set at which new short pulse reply data are inputted and a predetermined number of short pulse reply data (four in the example of FIG. 3) are stored.

Next, processing of each of the memory sections 510S, 510M, and 510L classified by the detection distances is described in more detail. Note that the memory sections 510S, 510M, and 510L are different in their storage capacities but their processing is substantially the same. Therefore, only the detailed processing of the memory section 510S will be described below as an example.

The memory section 510S deletes the oldest short pulse reply data among the stored past two or more short pulse reply data at the timing when a new short pulse reply signal is inputted, and then writes the new short pulse reply data in place of the oldest short pulse reply data. In this embodiment, this write processing is performed so as to allow the time-series arrangement of the short pulse reply data to be recognized.

For example, the memory section 510S stores the short pulse reply signals in the four memory areas together with time information (corresponding to the transmission timing information). When a newer short pulse reply data is inputted, it is written in the write address of the oldest short pulse reply data together with its time information. When a read control is performed, each short pulse reply data is outputted together with its time information, and the short pulse reply data are outputted based on their time information so that they are arranged in time-series. Alternatively, the memory section 510S may similarly set four memory areas inside thereof, but store the short pulse reply data in a reversed chronological order from LSB to MSB. When a newer short pulse reply data is inputted, memory update is carried out by shifting the short pulse reply data stored in the three memory areas by one memory area from LSB side to MSB side, and the new short pulse reply data is written in the memory area on the most LSB side. Then, when a read control is performed, the short pulse reply data are sequentially outputted, starting from the MSB-side memory area.

By configuring as described above, when the pulse reply data corresponding to the short pulse signal PS, the middle pulse signal PM, and long pulse signal PL transmitted at the predetermined pulse repetition cycles PRF are inputted, two or more pulse reply data can be stored corresponding to the respective distance ranges without changing their time-series arrangement. Further, because the two or more, predetermined number of the pulse reply data are separately stored corresponding to the respective detection distances, even if it is under the situation where the pulse reply data of different kinds are inputted while being switched therebetween, the read processing at the time of performing the pulse integration for each detection distance can be simplified.

Such processing can be realized by optimizing the setting of the write addresses and read control as described above. Therefore, it is possible to certainly and easily perform writing and reading of the pulse reply data for every kind without requiring a complicated circuit configuration or complicated processing.

The pulse integrating module 52 reads the predetermined number of pulse reply data for each detection distance as described above, and then performs pulse integration processing for each detection distance using a known method. The pulse integration results are outputted to the image data generating module 53.

For example, as shown in FIG. 2, when a transmitting control is performed, the received data storing module 51 stores the short pulse reply data, the middle pulse reply data, and the long pulse reply data so as to be sequentially switched. When the predetermined number (four in this embodiment) of short pulse reply data are stored, a read control is carried out, and these short pulse reply data are then inputted into the pulse integrating module 52. The pulse integrating module 52 performs pulse integration utilizing DFT (Discrete Fourier Transform), FFT (Finite Fourier Transform) or the like with these predetermined number of short pulse reply data, calculates detection result of the short-distance area, and then outputs it to the image data generating module 53. When the predetermined number (four in this embodiment) of middle pulse reply data are stored, a read control is carried out, and the read data are inputted into the pulse integrating module 52. The pulse integrating module 52 performs pulse integration utilizing DFT, FFT or the like with these four middle pulse reply data, calculates detection result of the middle-distance area, and then outputs it to the image data generating module 53. When the predetermined number (four in this embodiment) of long pulse reply data are stored, a read control is carried out, and the read data are inputted into the pulse integrating module 52. The pulse integrating module 52 performs pulse integration utilizing DFT, FFT or the like with these four long pulse reply data, calculates detection result of the long-distance area, and then outputs it to the image data generating module 53. The image data generating module 53 forms image data based on the detection result for each detection distance area outputted from the pulse integrating module 52, and then outputs it to a display.

At this time, even if the antenna rotates and a phase gap occurs between the respective pulse reply data, this phase gap can be eliminated by using DFT or FFT for the pulse integration. Thereby, the S/N ratio and the detection performance can be improved. Note that, if each of the memory sections 510S, 510M, and 510L of the received data storing module 51 has a capacity for storing pulse reply data for $2^n$ times for every pulse width of the transmitted pulse signal, FFT will be used rather than DFT because it is faster than DFT.

Figure 3:
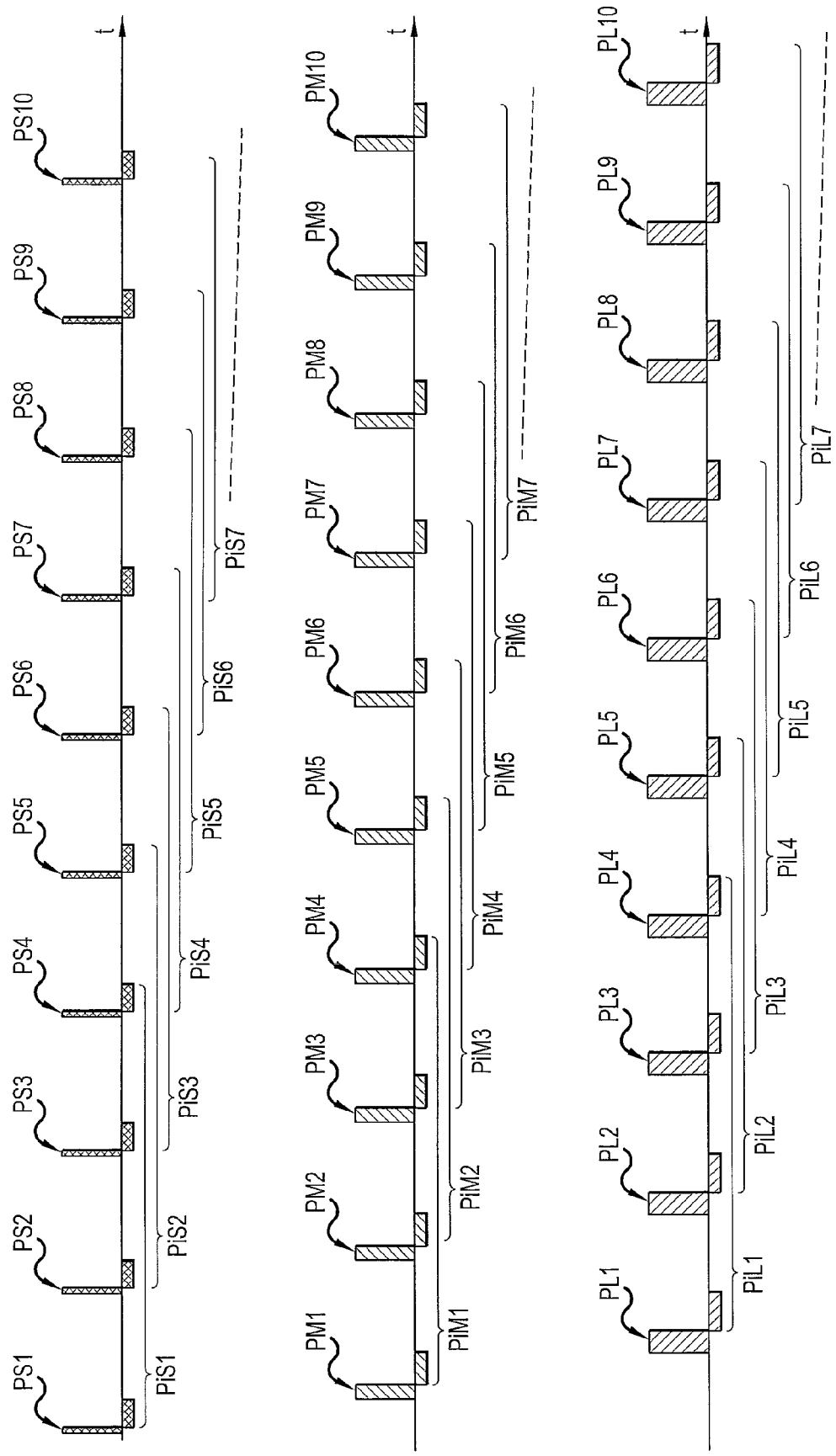
FIG. 3 is a timing chart showing a concept of detection using pulse integration for each detection distance area.
Figure 4:
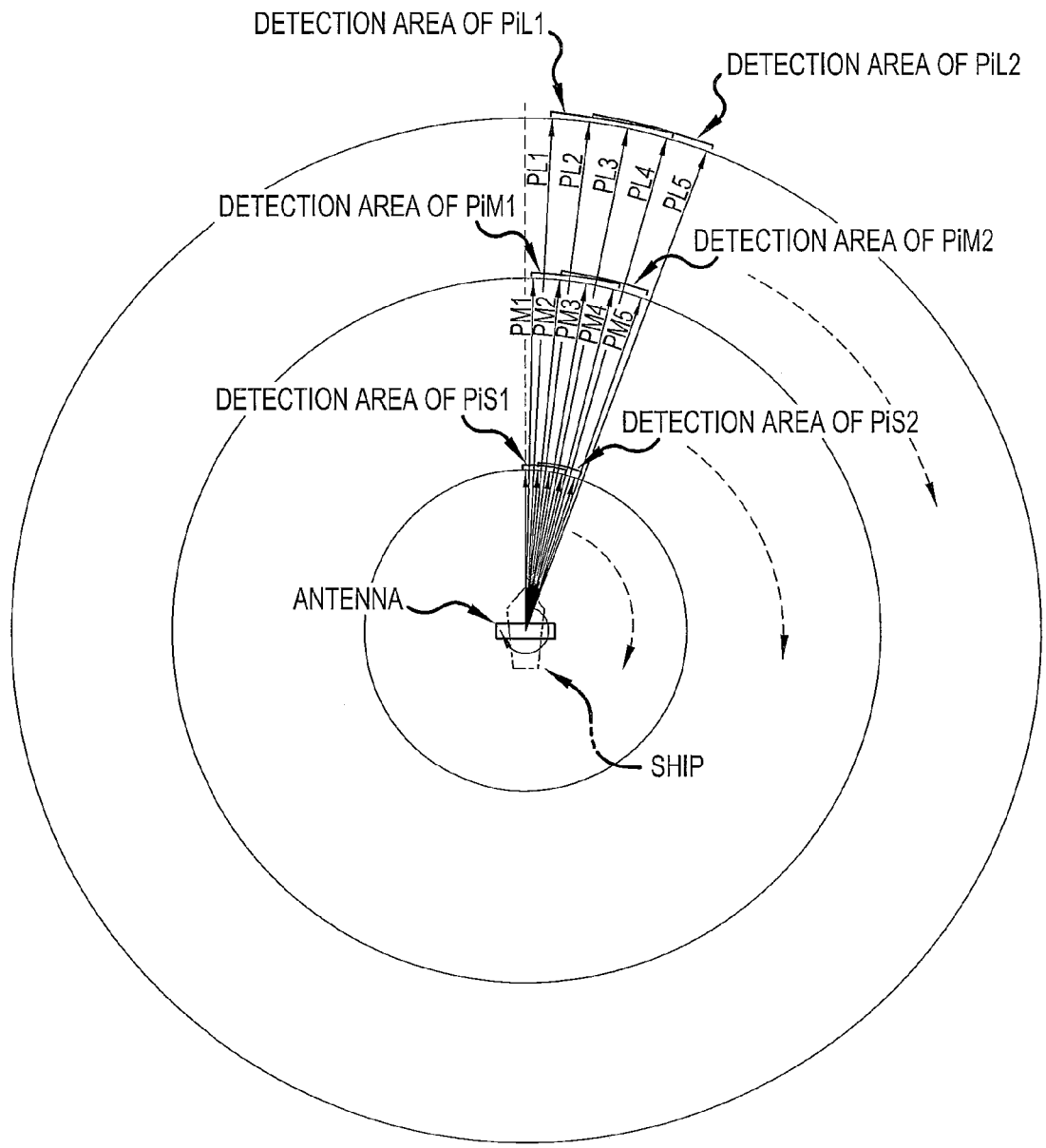
FIG. 4 is a view illustrating overlaps of azimuth ranges by the detection using the pulse integration of this embodiment.

Next, processing of the pulse integrating module 52 is described using a more detailed example. The pulse integrating module 52 performs detection for every detection distance area using the pulse integral method in the procedure described below. FIG. 3 is a timing chart showing a concept of the detection by the pulse integration for each detection distance area. FIG. 4 is a view illustrating overlaps of the azimuth ranges by the detection using the pulse integration.

The pulse integrating module 52 first performs a first pulse integration PiS1 for short-distance detection using the short pulse reply data group based on the short pulse signals PS1-PS4 to perform short-distance area detection of an azimuth corresponding to the short pulse signals PS1-PS4. Next, the pulse integrating module 52 performs a first pulse integration PiM1 for middle-distance detection using the middle pulse reply data group based on the middle pulse signals PM1-PM4 to perform middle-distance area detection of an azimuth corresponding to the middle pulse signals PM1-PM4. Here, the azimuth range corresponding to the short pulse signals PS2-PS4 of the first pulse integration PiS1 for the short-distance detection and the azimuth ranges corresponding to the middle pulse signals PM1-PM3 of the first pulse integration PiM1 for the middle-distance detection overlap with each other. Therefore, the detection azimuth range based on the first pulse integration PiS1 for the short-distance detection and the detection azimuth range based on the first pulse integration PiM1 for the middle-distance detection also overlap with each other.

Next, the pulse integrating module 52 performs a first pulse integration PiL1 for long-distance detection using the long pulse reply data group based on the long pulse signals PL1-PL4 to perform long-distance area detection of an azimuth corresponding to the long pulse signals PL1-PL4. Here, the azimuth range corresponding to the middle pulse signals PM2-PM4 of the first pulse integration PiM1 for the middle-distance detection and the azimuth range corresponding to the long pulse signals PL1-PL3 of the first pulse integration PiL1 for the long-distance detection overlap with each other. Therefore, the detection azimuth range based on the first pulse integration PiM1 for the middle-distance detection and the detection azimuth range based on the first pulse integration PiL1 for the long-distance detection also overlap with each other. Similarly, the azimuth range for target object detection based on the first pulse integration PiS1 for the short-distance detection and the detection azimuth range based on the first pulse integration PiL1 for the long-distance detection overlap with each other.

As described above, after the detection based on the short pulse signals PS1-PS4, the middle pulse signals PM1-PM4, and the long pulse signals PL1-PL4 are performed, a target object detecting module 72 performs target object detection using a second pulse integration PiS2 for the short-distance detection based on the short pulse signals PS2-PS5. Next, the target object detecting module 72 performs detection using a second pulse integration PiM2 for the middle-distance detection based on the middle pulse signals PM2-PM5, and further, it performs detection using a second pulse integration PiL2 for the long-distance detection based on the long pulse signals PL2-PL5. The pulse integrating module 52 repeats the detection for every distance range by such pulse integrations.

Figure 5:
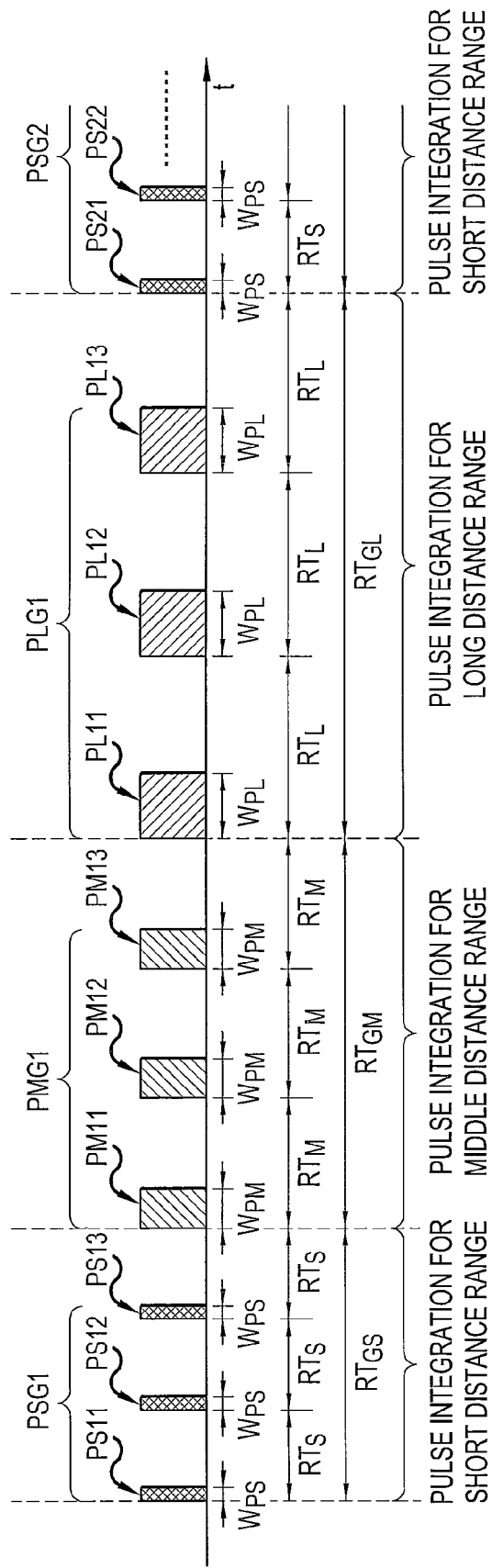
FIG. 5 is a timing chart explaining the case where a concept of pulse integration as shown in a radar device of JP 3639124 (B) is combined with the configuration for sequentially transmitting short pulses, middle pulses, and long pulses as shown in JP 2008-527391.
Figure 6:
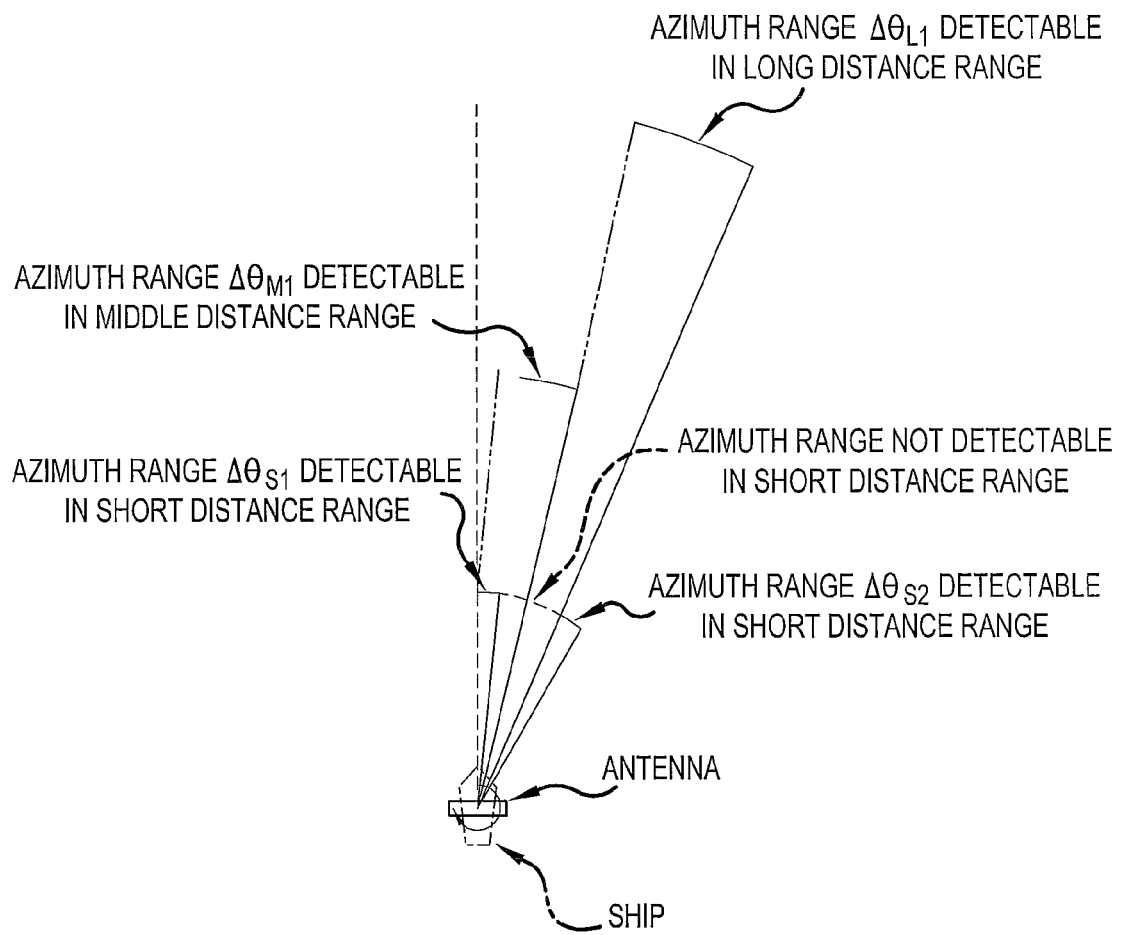
FIG. 6 is a schematic diagram showing the situation caused when the transmission of FIG. 5 is performed.

After performing such processing, as shown in FIG. 5, the detection azimuth range using the first pulse integration PiS1 for the short-distance detection according to the short pulse signals PS1-PS4 and the detection azimuth range using the second pulse integration PiS2 for the short-distance detection according to the short pulse signals PS2-PS5 overlap with each other in a range corresponding to the short pulse signals PS2-PS4. Similarly, the detection azimuth range using the first pulse integration PiM1 for the middle-distance detection according to the middle pulse signals PM1-PM4 and the detection azimuth range using the second pulse integration PiM2 for the middle-distance detection according to the middle pulse signals PM2-PM5 overlap with each other in a range corresponding to the middle pulse signals PM2-PM4. Similarly, the detection azimuth range using the first pulse integration PiL1 for the long-distance detection according to the long pulse signals PL1-PL4 and the detection azimuth range using the second pulse integration PiL2 for the long-distance detection according to the long pulse signals PL2-PL5 overlap with each other in a range corresponding to the long pulse signals PL2-PL4.

For this reason, as shown in FIG. 4, the adjacent detection azimuth ranges for the same detection distance area partially overlap with each other. Therefore, it is possible to detect all azimuth directions as sequentially shifting the detection azimuth range in the antenna rotating direction. Thereby, even if a technique of performing pulse integration using pulse signals is used in this embodiment, it can prevent that the azimuth range which cannot be detected in the corresponding detection distance area occurs, while still maintaining the azimuth resolution to some extent at equal intervals in all azimuth directions. If a target object which is relatively slow in speed, such as a ship or car, as compared with a faster object, such as an airplane, reflection signals (pulse reply signals) from the slow target object can be easily obtained because a consecutive series of pulse signals of the same detection distance area consecutively hit the target object. Therefore, as for the slow target object, the configuration and processing of this embodiment can be utilized more effectively.

In the above embodiment, an example in which a detection distance area is divided into three kinds, such as the short-distance area, the middle-distance area, and the long-distance area; however, two, or four or more detection distance areas may also be used. For example, the entire detection area may be divided into four kinds of detection distance areas, and the pulse signals having different pulse widths may be set for the respective kinds of detection areas. Pulse transmitting groups PG may be formed using the four pulse signals having different pulse widths to perform detection. Thus, as long as the entire detection area is divided into two or more detection distance areas, the configuration and processing described above can be applied.

In the above embodiment, an example in which the pulse signals are transmitted in order of the short pulse signal for short-distance area, the middle pulse signal for middle-distance area, and the long pulse signal for long-distance area. However, the transmission order of the short pulse signal, the middle pulse signal, and the long pulse signal is not limited to this, and may be in any other order. For example, the transmission order of the short pulse signal, the middle pulse signal, and the long pulse signal may be changed between pulse transmitting groups.

In the above embodiment, the case where the number of the pulse reply data used for the pulse integration is the same between the detection distances; however, the pulse integration may be performed with the different number of pulse reply data according to the detection distance. For example, the pulse integration may be carried out for 16 data for the short-distance area detection, 8 data for the middle-distance area detection, and 4 data for the long-distance area detection. Alternatively, the pulse integration may be carried out for 8 data for the short-distance area detection and the middle-distance area detection, and 4 data for the long-distance area detection. Thus, the number of the pulse reply data used for the pulse integration in each detection distance may be suitably set according to application. As described above, by allowing the number of pulse integration to be changed according to the pulse width for transmission, it enables the degree of freedom in design of the pulse width and the combination of the pulse widths to acquire the signals having desired reflection intensities from desired target object(s).

In the above embodiment, the case where the pulse integration is performed every time a new pulse reply data is stored in the memory module classified by detection distance. However, a new pulse integration processing may be performed when the pulse reply data of the entire memory module classified by the detection distances is updated with different data from all the pulse reply data used for the last pulse integration. By using such processing, the number of pulse integration processing can be reduced.

In the foregoing specification, particular embodiments of the present invention have been described. However, one of ordinary skill in the art appreciates that various modifications and changes can be made without departing from the scope of the present invention as set forth in the claims below. Accordingly, the specification and figures are to be regarded in an illustrative sense rather than a restrictive sense, and all such modifications are intended to be included within the scope of the present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual relationship or order between such entities or actions. The terms "comprises," "comprise," "has," "having," "includes,"

"including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A radar device, comprising:
   a transmission module for sequentially transmitting two or more kinds of pulse signals having different pulse widths by a predetermined transmitting pattern;
   a memory module for storing a predetermined number of pulse reply data corresponding to each kind of the pulse signals, the predetermined number being number of transmissions of the kind of the pulse signals;
   a pulse integrating module for performing pulse integration of the pulse reply data stored in the memory module for each kind of the pulse signal; and
   an image generating module for generating a radar image using the results of the pulse integration.

2. The radar device of claim 1, wherein the memory module includes two or more classified-by-detection-distance memory sections classified by the kinds of pulse signals;
   when new pulse reply data is stored in each of the classified-by-detection-distance memory sections, the memory module updates the stored pulse reply data by the same number of the newest pulse reply data including the new pulse reply data so that time-series arrangement of the pulse reply data is maintained; and
   the pulse integrating module performs the pulse integration using the predetermined number of stored pulse reply data containing the new pulse reply data every time the memory updating is performed.

3. The radar device of claim 1, wherein the memory module includes two or more classified-by-detection-distance memory sections classified by the kinds of pulse signals;
   the classified-by-detection-distance memory sections each stores a predetermined number of pulse reply data, the predetermined numbers being different for the kinds of pulse signals; and
   the pulse integrating module performs pulse integration of the pulse reply data stored in the classified-by-detection-distance memory section for each kind of the pulse signals.

4. A radar device, comprising:
   a transmission module for repeatedly transmitting a pulse group containing two or more kinds of pulse signals having different pulse widths;
   a memory module for storing a predetermined number of pulse reply data corresponding to the transmitted pulse signals contained in each of the pulse groups, the predetermined number being number of transmissions of the pulse group;
   a pulse integrating module for performing pulse integration of the stored pulse reply data corresponding to the transmitted pulse signals contained in each of the pulse groups; and
   an image generating module for generating a radar image using the results of the pulse integration.

5. The radar device of claim 4, wherein, when new pulse reply data is stored in the memory module, the memory module updates the stored pulse reply data by the same number of the newest pulse reply data including the new pulse reply data so that time-series arrangement of the pulse reply data is maintained; and
   the pulse integrating module performs the pulse integration using the predetermined number of stored pulse reply data containing the new pulse reply data every time the memory updating is performed.

6. A method of detecting a target object using radar, comprising:
   sequentially transmitting two or more kinds of pulse signals having different pulse widths by a predetermined transmitting pattern;
   storing a predetermined number of pulse reply data corresponding to each kind of the pulse signals, the predetermined number being number of transmissions of the kind of the pulse signals;
   performing pulse integration of the stored pulse reply data for each kind of the pulse signal; and
   generating a radar image using the results of the pulse integration.

7. The method of claim 6, wherein the storing the predetermined number of pulse reply data corresponding to each kind of the pulse signals includes, when new pulse reply data is stored in each of two or more classified-by-detection-distance memory sections classified by the kinds of pulse signals, updating the stored pulse reply data by the same number of the newest pulse reply data including the new pulse reply data so that time-series arrangement of the pulse reply data is maintained; and
   the performing pulse integration of the stored pulse reply data for each kind of the pulse signal includes performing the pulse integration using the predetermined number of stored pulse reply data containing the new pulse reply data every time the memory updating is performed.

8. The method of claim 6, wherein the storing the predetermined number of pulse reply data corresponding to each kind of the pulse signals includes storing, by each of two or more classified-by-detection-distance memory sections classified by the kinds of pulse signals, a predetermined number of pulse reply data, the predetermined numbers being different for the kinds of pulse signals; and
   the performing pulse integration of the stored pulse reply data for each kind of the pulse signal includes performing pulse integration of the pulse reply data stored in the classified-by-detection-distance memory section for each kind of the pulse signals.

9. A method of detecting a target object using radar, comprising:
   repeatedly transmitting a pulse group containing two or more kinds of pulse signals having different pulse widths;
   storing a predetermined number of pulse reply data corresponding to the transmitted pulse signals contained in each of the pulse groups, the predetermined number being number of transmissions of the pulse group;

performing pulse integration of the stored pulse reply data corresponding to the transmitted pulse signals contained in each of the pulse groups; and generating a radar image using the results of the pulse integration.

10. The method of claim 9, wherein the storing the predetermined number of pulse reply data corresponding to the transmitted pulse signals contained in each of the pulse groups includes, when new pulse reply data is stored, updating the stored pulse reply data by the same number of the newest pulse reply data including the new pulse reply data so that time-series arrangement of the pulse reply data is maintained; and the performing pulse integration of the stored pulse reply data corresponding to the transmitted pulse signals contained in each of the pulse groups includes performing the pulse integration using the predetermined number of stored pulse reply data containing the new pulse reply data every time the memory updating is performed.

* * * * *